United States Patent
Kanno

(10) Patent No.: US 8,081,100 B2
(45) Date of Patent: Dec. 20, 2011

(54) READ SIGNAL PROCESSOR, IMAGE READING APPARATUS, AND IMAGE FORMING APPARATUS

(75) Inventor: Tohru Kanno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1127 days.

(21) Appl. No.: 11/851,657

(22) Filed: Sep. 7, 2007

(65) Prior Publication Data
US 2008/0068683 A1 Mar. 20, 2008

(30) Foreign Application Priority Data
Sep. 19, 2006 (JP) ................................ 2006-253189

(51) Int. Cl.
*H03M 1/12* (2006.01)
(52) U.S. Cl. ......... 341/155; 341/122; 341/141; 348/572
(58) Field of Classification Search .................. 341/122, 341/141, 155; 348/572
See application file for complete search history.

(56) References Cited

U.S. PATENT DOCUMENTS

| | | | |
|---|---|---|---|
| 5,408,113 A | 4/1995 | Kanno et al. | |
| 6,057,891 A * | 5/2000 | Guerin et al. | 348/572 |
| 6,198,349 B1 | 3/2001 | Kanno et al. | |
| 6,426,804 B1 | 7/2002 | Kanno et al. | |
| 7,154,495 B1 * | 12/2006 | Bucklen | 345/213 |
| 7,382,298 B1 * | 6/2008 | Bucklen | 341/118 |
| 7,480,012 B1 * | 1/2009 | Greenberg | 348/572 |
| 2004/0047007 A1 | 3/2004 | Kanno | |
| 2006/0176201 A1 | 8/2006 | Kimura et al. | |

FOREIGN PATENT DOCUMENTS

| | | |
|---|---|---|
| JP | 10-319919 | 12/1998 |
| JP | 2001-255841 | 9/2001 |
| JP | 2002-199213 | 7/2002 |
| JP | 2002-281325 | 9/2002 |
| JP | 2004-72344 | 3/2004 |
| JP | 2005-12752 | 1/2005 |
| JP | 2006-222750 | 8/2006 |

OTHER PUBLICATIONS

U.S. Appl. No. 12/099,508, filed Apr. 8, 2008, Nakazawa, et al.
U.S. Appl. No. 12/119,941, filed May 13, 2008, Nagase, et al.

* cited by examiner

*Primary Examiner* — Khai M Nguyen
(74) *Attorney, Agent, or Firm* — Oblon, Spivak, McClelland, Maier & Neustadt, L.L.P.

(57) ABSTRACT

A read signal processor includes an output unit that serializes a plurality of bits of digital data for each of the colors to obtain a plurality of serial signals, converts the serial signals to a plurality of low-amplitude differential signals, and outputs the serial low-amplitude differential signals.

16 Claims, 22 Drawing Sheets

READ SIGNAL PROCESSOR, IMAGE READING APPARATUS, AND IMAGE FORMING APPARATUS

CROSS-REFERENCE TO RELATED APPLICATIONS

The present application claims priority to and incorporates by reference the entire contents of Japanese priority document, 2006-253189 filed in Japan on Sep. 19, 2006.

BACKGROUND OF THE INVENTION

1. Field of the Invention

The present invention relates to a read signal processor, an image reading apparatus, and an image forming apparatus.

2. Description of the Related Art

FIG. 23 is a schematic block diagram of a typical signal processor in a typical image reading apparatus. In the example shown in FIG. 23, an analog signal processing IC 10 having three inputs, RIN for red (R), GIN for green (G), and BIN for blue (B), is used corresponding to a color linear image sensor 1 having three outputs: RO for red, GO for green, and BO for blue. The analog signal processing IC 10 includes, with respect to each of the inputs, a clamp circuit (CLMP) 11 for setting an input terminal potential after alternate-current coupling, a sample-hold (SH) circuit 12 for extracting signal components of only the output signal of the color linear image sensor 1, and a variable gain amplifier (VGA) 13 for amplifying sample-hold signals based on a designated amplification rate. Subsequently, an analog multiplex circuit (AMPX) 14 switches variable gain amplifier outputs for each color and converts them to point sequential signals in the order of RGB, and an analog-digital converter (ADC) 15 converts the analog signals to digital signals and outputs the digital signals as point sequential image data (DO[9:0]).

The analog signal processing IC 10 includes a timing generator & interface (TG&IF) 16 that receives from outside a CLMPIN signal, an SH signal, and an MCLK signal. The CLMPIN signal is a gate signal for controlling the clamp circuits 11. The SH signal is a sample clock for sampling a signal area of image signals in the SH circuits 12. The MCLK signal is a reference clock for controlling the AMPX 14 and the ADC 15. An RMB signal is an identification signal for indicating timing of RED data. The variable gain amplifier 13 includes a register for holding a gain set value received through a data/address bus. FIG. 24 is timing chart for explaining output timings of the signals RIN, GIN, BIN, SH, MCLK, M1, M2, DO[9:0], and RMB.

For example, Japanese Patent Applications Laid-open Nos. 2002-199213 (patent document 1) and 2002-281325 (patent document 2) disclose related technology. The technology disclosed in the patent document 1 provides an image reading apparatus capable of alleviating an output difference between an odd pixel and an even pixel. Specifically, the image reading apparatus disclosed in the patent document 1 includes an optical unit (a halogen lamp and a lens unit) for reading an image on a document, a solid image sensor (CCD) for performing photoelectric conversion to optical data and outputting image data that corresponds to the document image when the optical data read by the optical unit is input, an analog signal processor (a sample-hold circuit, a black-level correction circuit, an amplification circuit) that processes image signals output from the solid image sensor in an analog way, and two of A/D converters that are arranged for each channel of RGB and A/D convert image signals processed by the analog signal processor. The two of A/D converters include two types of input clocks that are different in phase.

On the other hand, the technology disclosed in the patent document 2 provides a color image reading apparatus that can exchange R/B image data with a simple configuration and performs signal processing with respect to image data read from a RGB 3 line linear sensor. Specifically, the image reading apparatus disclosed in the patent document 2 includes the internal function of exchanging R/B image data with an ASIC for performing signal processing to a CCD, motor, and lamp driving signal and image data and R/G image data is exchanged through the function.

The conventional signal processing IC is effective for a color linear image sensor with a relatively low pixel rate (up to about 10 megahertz per color), that is, when the output from a color linear image sensor is through one channel per one color. However, if the pixel rate is higher, or if image data is to be transmitted for a longer distance (a few tens of centimeters or more), it is necessary not only to provide another driver but also to perform processing of resolving point sequential image data for each color. Thus, the conventional signal processing IC is disadvantageous in terms of mounting area and component costs.

SUMMARY OF THE INVENTION

It is an object of the present invention to at least partially solve the problems in the conventional technology.

According to an aspect of the present invention, there is provided a read signal processor including a sample-hold unit that sample-holds a designated range of each pixel of a sensor output signal for each color with respect to output from a color linear image sensor corresponding to three colors, and outputs a sample-held signal corresponding to each of the colors; an amplifying unit that amplifies the sample-held signals based on a set gain, and outputs an amplified signal corresponding to each of the colors; a converting unit that analog-digital converts the amplified signals to obtain digital data for each of the colors; and an output unit that serializes a plurality of bits of the digital data for each of the colors to obtain a plurality of serial signals, converts the serial signals to a plurality of low-amplitude differential signals, and outputs the serial low-amplitude differential signals.

According to another aspect of the present invention, there is provided a read signal processor including a sample-hold unit that sample-holds a designated range of each pixel of a sensor output signal for each color with respect to output from a color linear image sensor corresponding to three colors, and outputs a sample-held signal corresponding to each of the colors; an amplifying unit that amplifies the sample-held signals based on a set gain, and outputs an amplified signal corresponding to each of the colors; a converting unit that analog-digital converts the amplified signals to obtain digital data for each of the colors; and a separating unit that separates the digital data for each of the colors into a plurality of bit groups and sequentially performs multiple-bit parallel output in time division.

According to still another aspect of the present invention, there is provided an image reading apparatus that includes the above read signal processor.

According to still another aspect of the present invention, there is provided an image forming apparatus that includes the above image reading apparatus.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention are explained below in detail with reference to the accompanying drawings.

Figure 1:
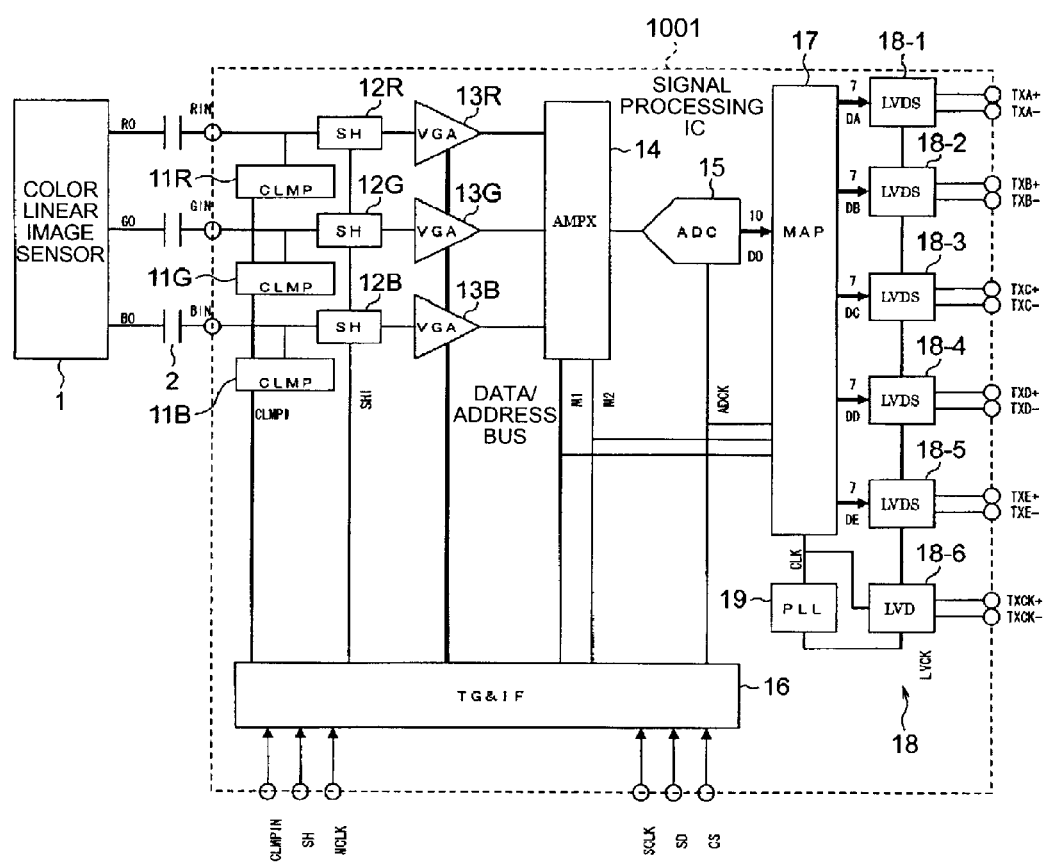
FIG. 1 is a schematic block diagram of an analog signal processor according to a first embodiment of the present invention.

FIG. 1 is a schematic block diagram of an analog signal processor according to a first embodiment of the present invention.

The analog signal processor has the function of serializing a plurality of bits of digital data for each color thereby generating a plurality of serial signals, converting the serial signals to low-amplitude differential signals, and outputting the low-amplitude differential signals as serial low-amplitude differential signals. The analog signal processor includes a color linear image sensor 1 and an analog signal processing IC 1001. The analog signal processing IC 1001 has three inputs, RIN for red (R), GIN for green (G), and BIN for blue (B), corresponding to three outputs of the color linear image sensor 1: RO for red, GO for green, and BO for blue. The outputs (RO, GO, BO) of the color linear image sensor 1 are connected through capacitors 2 to the inputs (RIN/GIN/BIN) of the analog signal processing IC 1001.

With respect to each of the inputs, the analog signal processing IC 1001 includes, corresponding to an input signal of each color, a clamp circuit (CLMP) (11R, 11G, 11B) for setting an input terminal potential after alternate current coupling, a sample-hold (SH) circuit (12R, 12G, 12B) for extracting signal components of only the output signal of the color linear image sensor 1, and a variable gain amplifier (VGA) (13R, 13G, 13B) for amplifying sample-hold signals based on a designated amplification rate. The analog signal processing IC 1001 also includes, on the downstream side of the variable gain amplifier (VGA) 13R, 13G, 13B, the analog multiplex circuit (AMPX) 14 for switching variable gain amplifier outputs for each color and converting them to point sequential signals in the order of RGB, and an analog-digital converter (ADC) 15 for converting the analog point sequential signals to digital point sequential signals.

Specifically, the analog multiplex circuit (AMPX) 14 selects VGA outputs for each color in turn, makes them one signal sequence, and outputs 10-bit image data (Do[9:0]) as one signal sequence through the ADC 15. The variable gain amplifiers 13R, 13G, 13B include a register (not shown) that holds a gain set value received through a data address bus (not shown).

The analog signal processing IC 1001 includes the timing generator & interface (TG&IF) 16 that receives from outside a CLMPIN signal, an SH signal, an MCLK signal, an SCLK signal, an SD signal, and a CS signal. The CLMPIN signal is a gate signal for controlling the clamp circuits 11R, 11G, 11B. The SH signal is a sample clock for sampling a signal area of image signals in the SH circuits 12R, 12G, 12B. The MCLK signal is a reference clock for controlling the AMPX 14 and the ADC 15. An RMB signal is an identification signal that defines timing of RED data. An M1 signal and an M2 signal are signals for selecting signals input to the analog multiplex circuit 14. The SCLK signal is a serial clock, the SD signal is serial data, and the CS signal is a chip select signal.

Image data Do[9:0] output from the ADC 15 is supplied to a MAP 17 block that resolves point sequential image data for each color and separates it into blocks that include a plurality of bits respectively. In this case, 7 bits are generally considered as LVDS (low voltage differential signaling).

The data is separated into five groups of 7 bits (DA to DE) in the MAP 17 and is output to an LVDS block 18. In the LVDS block 18, input data that includes 7 parallel bits is converted to serial 7-bit low-amplitude differential signals based on an LVCK that is 7 times of the M1 clock and resulting serial 7-bit low-amplitude differential signals are output to terminals TXA to TXE. Low-amplitude differential signals TXA+, TXA− to TXE+, TXE− are output from the terminals TXA to TXE respectively. A reference numeral 19 denotes a phase-locked loop (PLL) that supplies a clock multiplied 7 times to an LDV. An LVCK is supplied from an LVD 18-6 to each of LVDSs 18-1 to 18-5. Here, the LVDS 18 includes 5 data pair sequences of 18-1 to 18-5 and a clock as one data pair sequence of 18-6.

Figure 2:
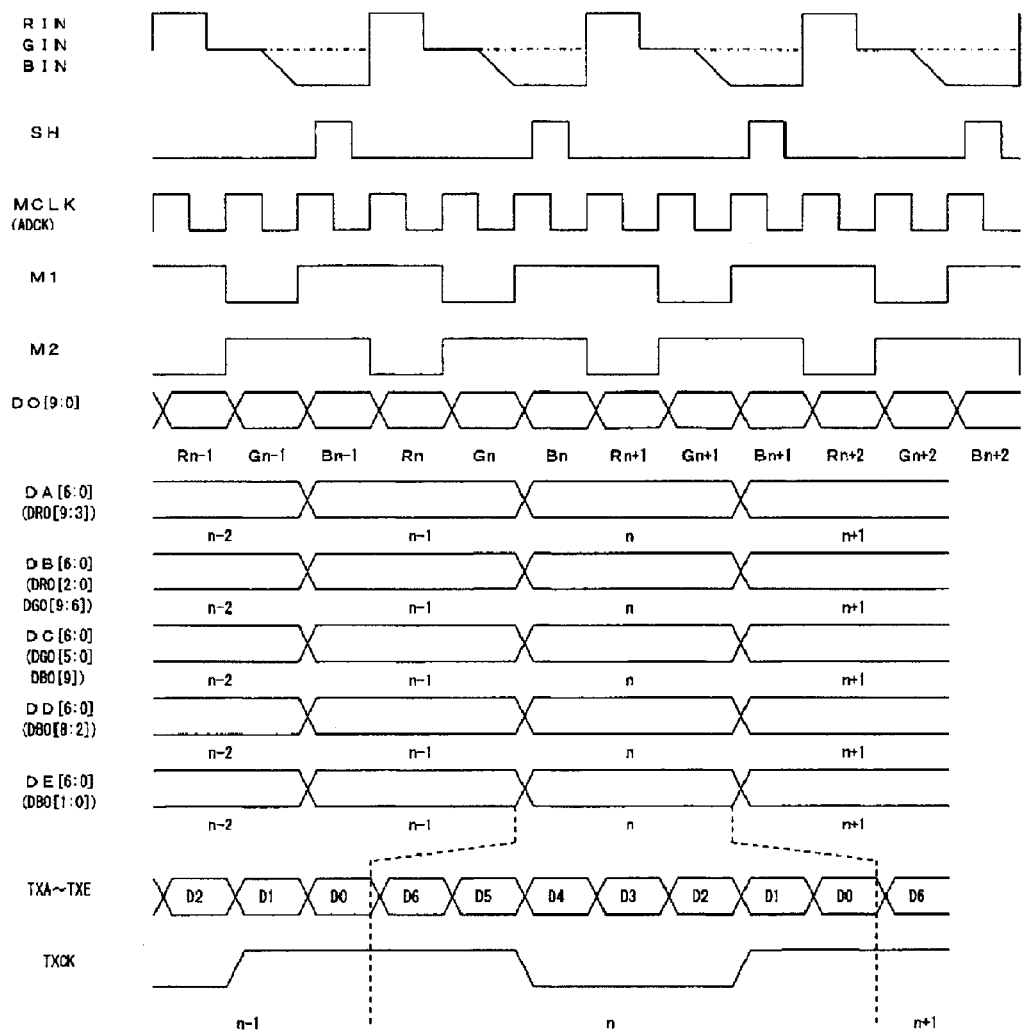
FIG. 2 is a timing chart of output timing of signal shown in FIG. 1.

FIG. 2 is a timing chart of output timings of each signal shown in FIG. 1. In the timing chart, DRO, DGO, and DBO respectively represents a R signal, a G signal, and a B signal in a 10-bit image data DO.

This configuration enables low-amplitude differential output and long-distance transmission and high-pixel rate transmission without adding components.

Figure 3:
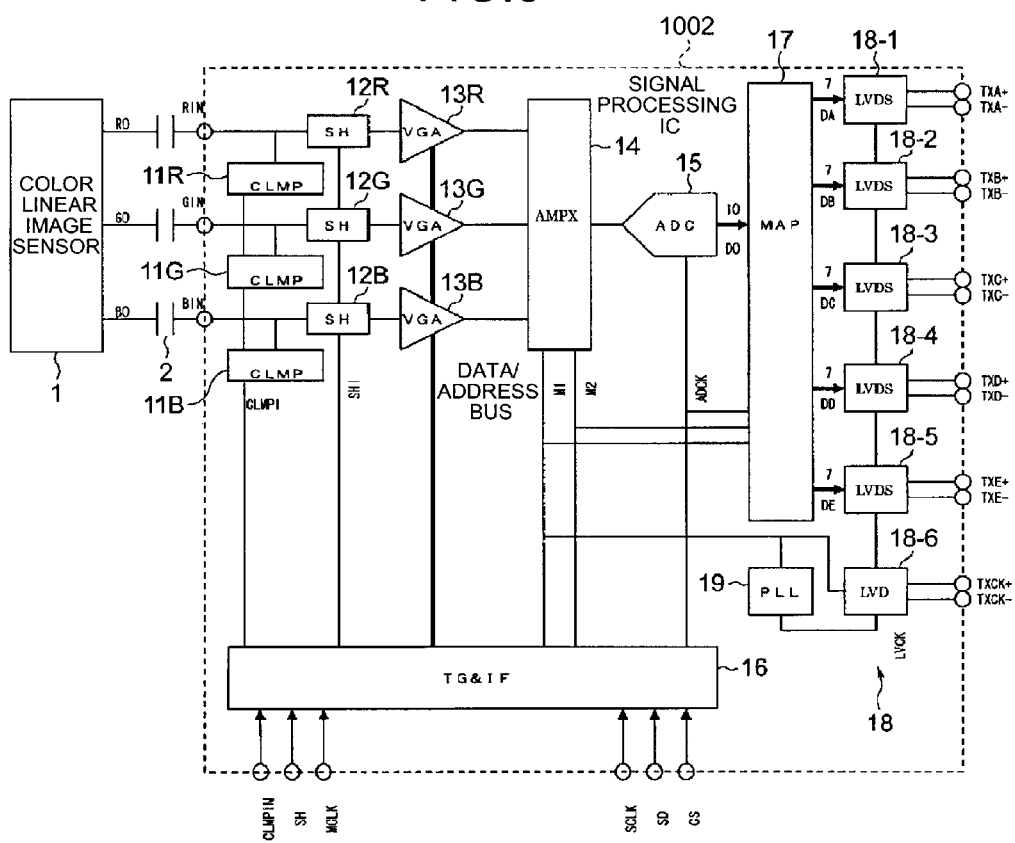
FIG. 3 is a schematic block diagram of an analog signal processor according to a second embodiment of the present invention.
Figure 4A:
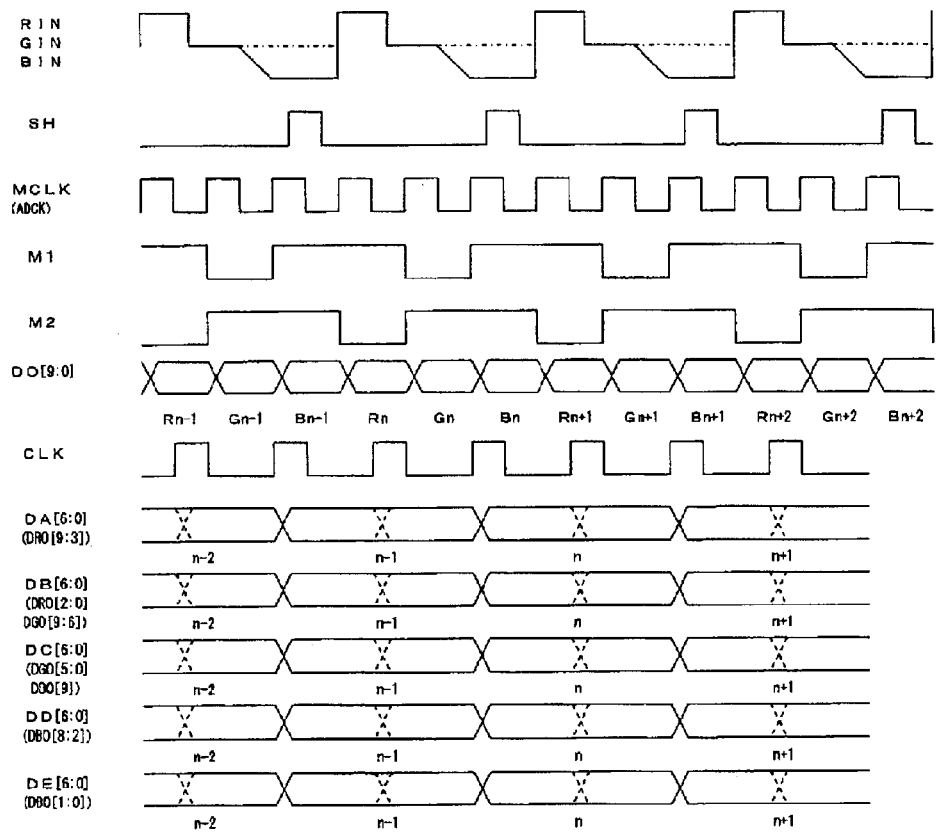
FIGS. 4A and 4B are timing charts of output timings of signals shown in FIG. 3.
Figure 4B:
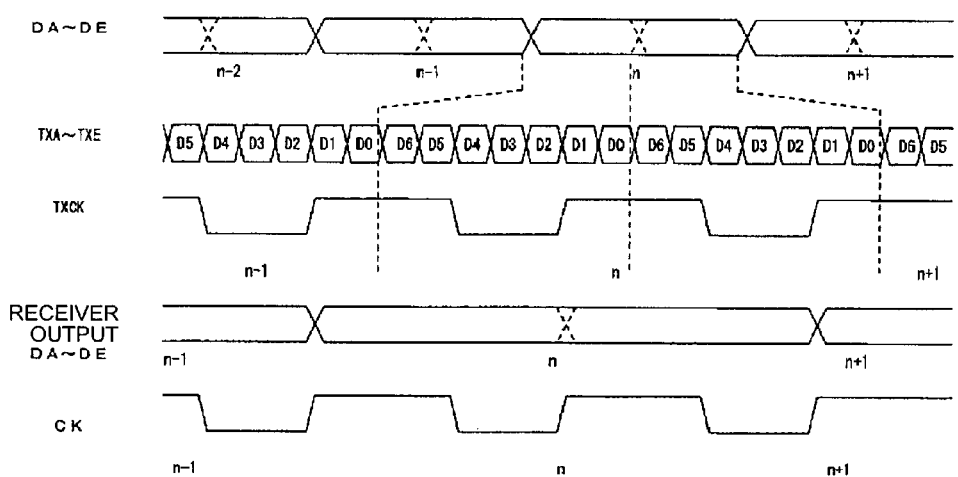

FIG. 3 is a schematic block diagram of an analog signal processor according to a second embodiment of the present invention. The analog signal processor according to the second embodiment includes an analog signal processing IC 1002. In the analog signal processing IC 1002, digital data for each color is n-multiplexed with regard to time and is transmitted at an n-fold data rate. That is, unlike the analog signal processing IC 1001, in the analog signal processing IC 1002, an operation clock of the LVDS block 18 is obtained from the MAP block 17 and an operation is performed by taking a clock CLK that corresponds to a two-fold pixel rate as a reference in the same configuration as in FIG. 2. The other components are constituted and function in the same manner as in the analog signal processing IC 1001 so that the explanation thereof is omitted. As shown in timing charts of FIGS. 4A and 4B, therefore, image data is output twice in a period of one pixel by repeating low-amplitude differential signals TXA to TXE. Likewise, a transmission clock TXCK that corresponds to two cycles in a period of one pixel is output. Receiver output in FIG. 4B indicates output timing of parallel signals output by a receiver (not shown) arranged to the rear of the analog signal processing IC 1002.

Besides, each component that is not particularly explained is constituted and functions in the same manner as in the analog signal processor of the first embodiment.

This configuration makes it possible to make transmission frequencies of low-amplitude differential signals high based on n-multiplexed image data. Therefore, in the case of a low pixel rate, it is possible to reduce effects of low limits in operation frequencies from the receiver shown in the timing chart of FIG. 4B.

Figure 5:
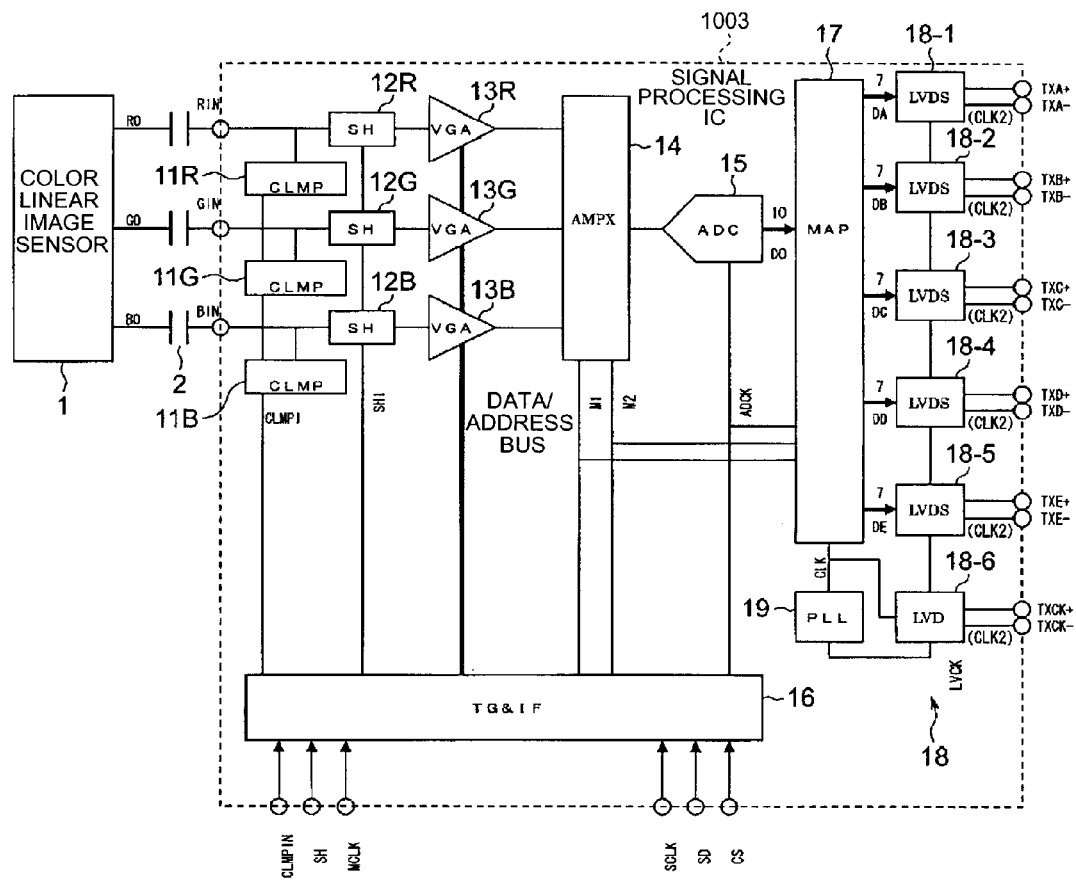
FIG. 5 is a schematic block diagram of an analog signal processor according to a third embodiment of the present invention.

FIG. 5 is a schematic block diagram of an analog signal processor according to a third embodiment of the present invention. The analog signal processor according to the third embodiment includes an analog signal processing IC 1003. Clocks that correspond to digital data for each color and digital data rates for each color are serialized, a plurality of serial signals are generated, and they are converted to low-amplitude differential signals, which are output as a plurality of serial low-amplitude differential signals.

The third embodiment has almost the same configuration as in the second embodiment except that a latch clock CLK 2 for latching output of low-amplitude differential signals from a receiver is embedded in low-amplitude differential signals and is transmitted together with image data.

Figure 6A:
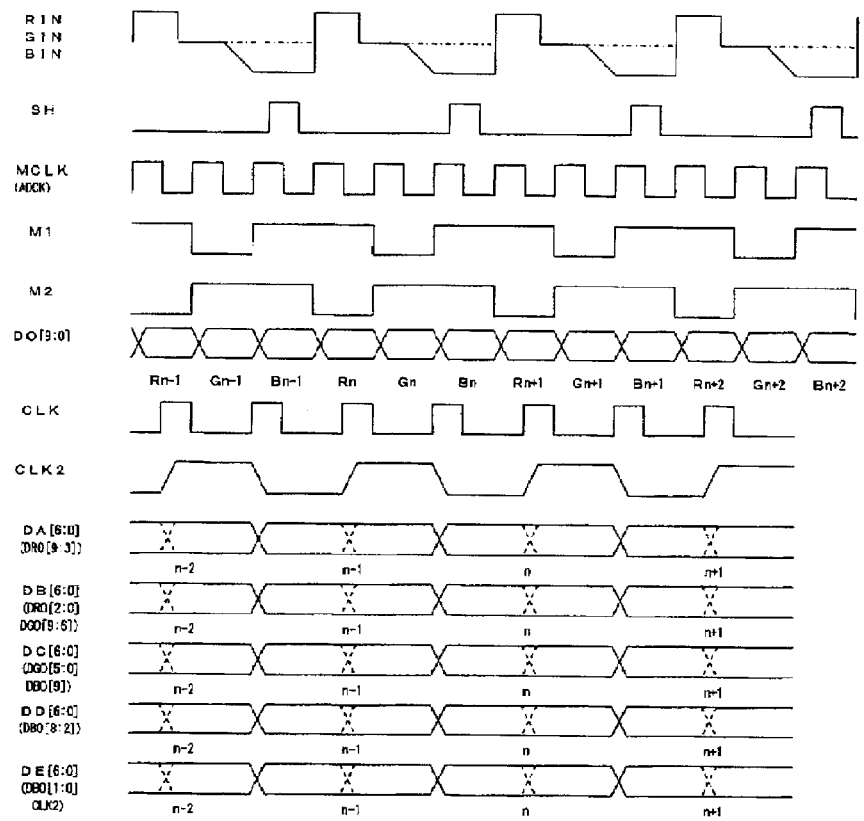
FIGS. 6A and 6B are timing charts of output timings of signals shown in FIG. 5.
Figure 6B:
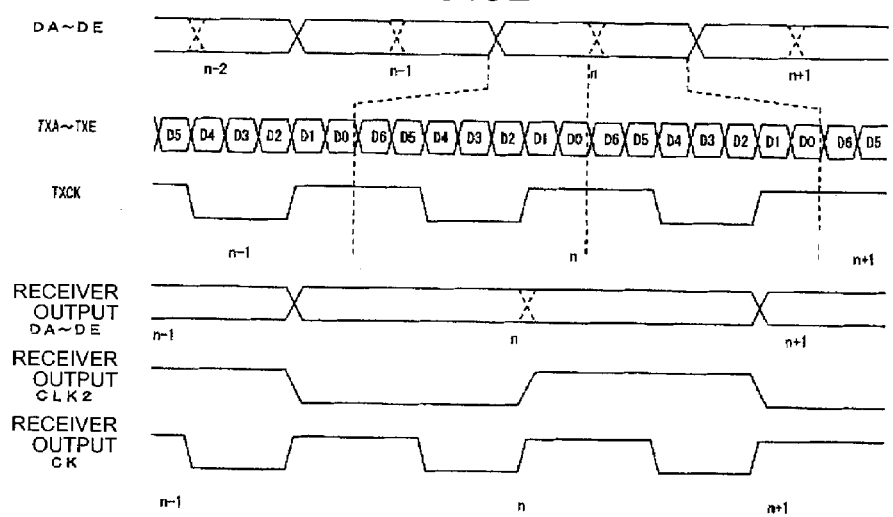

FIGS. 6A and 6B are timing charts for indicating output timings of each signal in the analog signal processor. As shown in FIGS. 6A and 6B, receiver output CK is output based on the CLK 2.

Besides, each component that is not particularly explained is constituted and functions in the same manner as in the first and second embodiments.

This configuration enables, in addition to effects of the first and second embodiments, because of transmission of image data and identification signals for multiplexing and restoring separation, easy multiplexing and restoring separation based on the identification signals as well as controlling increasing costs accompanied by multiplexing and separation to a minimum.

Figure 7:
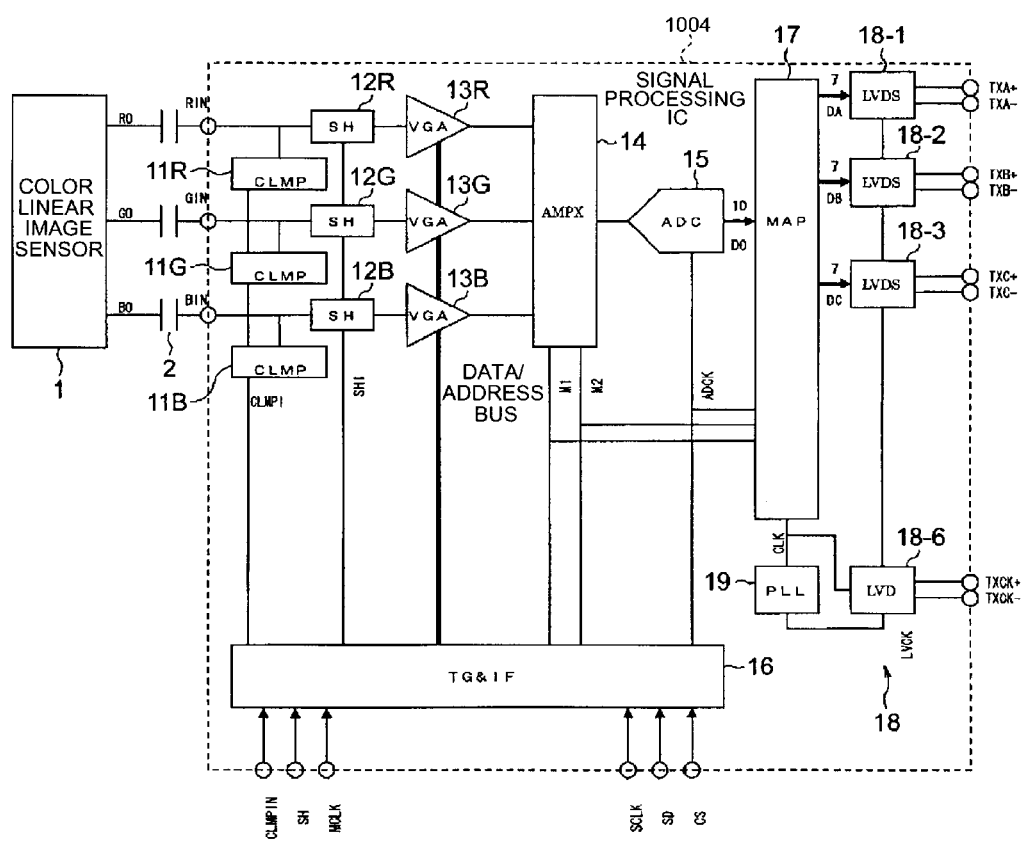
FIG. 7 is a schematic block diagram of an analog signal processor according to a fourth embodiment of the present invention.

FIG. 7 is a schematic block diagram of an analog signal processor according to a fourth embodiment of the present invention. The analog signal processor according to the fourth embodiment includes an analog signal processing IC 1004. In the analog signal processing IC 1004, digital data for each color is separated into a plurality of groups of n-bits, is converted to time-division data in sequence, and is transmitted at an n-fold data rate as a plurality of serial low-amplitude differential signals.

The fourth embodiment has almost the same configuration as in the second embodiment except three data outputs of DA, DB, DC from the MAP 17 block. In the MAP 17 block, that is, point sequential image data sent from the ADC 15 is resolved into data for each color. Moreover, the data is separated into a high-order bit group and a low-order bit group for each color and is output as DA, DB, DC in the order of the high-order bit group to the low-order bit group in time sequence. DA, DB, DC have 7 bits respectively. In this example, the high-order bit group and the low-order bit group for each color have 5 bits respectively and the other bits are occupied by "0" or "1". They are output as three-sequence low-amplitude differential signals from the LVDS 18 block.

Figure 8A:
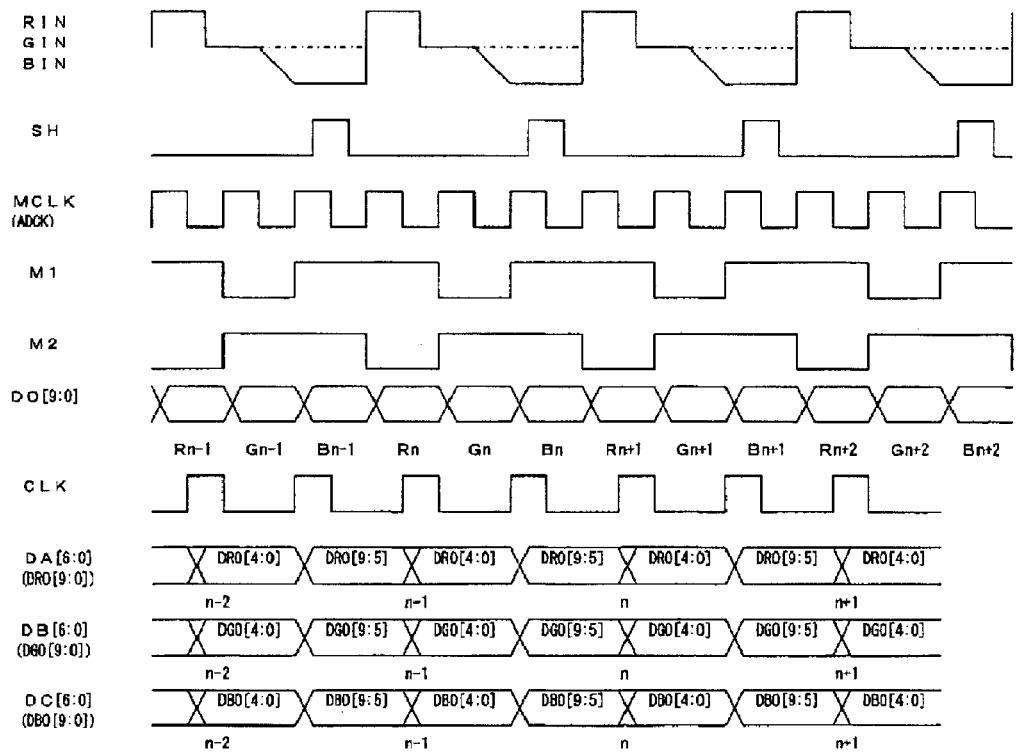
FIGS. 8A and 8B are timing charts of output timings of signals shown in FIG. 7.
Figure 8B:
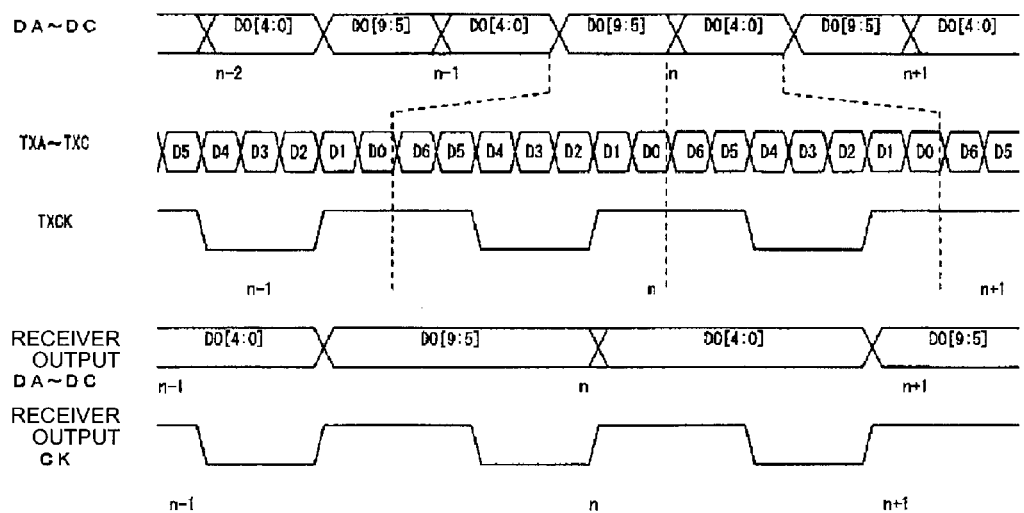

FIGS. 8A and 8B are timing charts for indicating output timing of each signal in the analog signal processor.

Besides, each component that is not particularly explained is constituted and functions in the same manner as in the first and second embodiments.

This configuration enables, in addition to effects of the first and second embodiments, reduction of the number of transmission lines that are required because image data is separated into bit groups and is transmitted in time division as low-amplitude differential signals. As a result, this makes it possible to lead to low costs.

Figure 9:
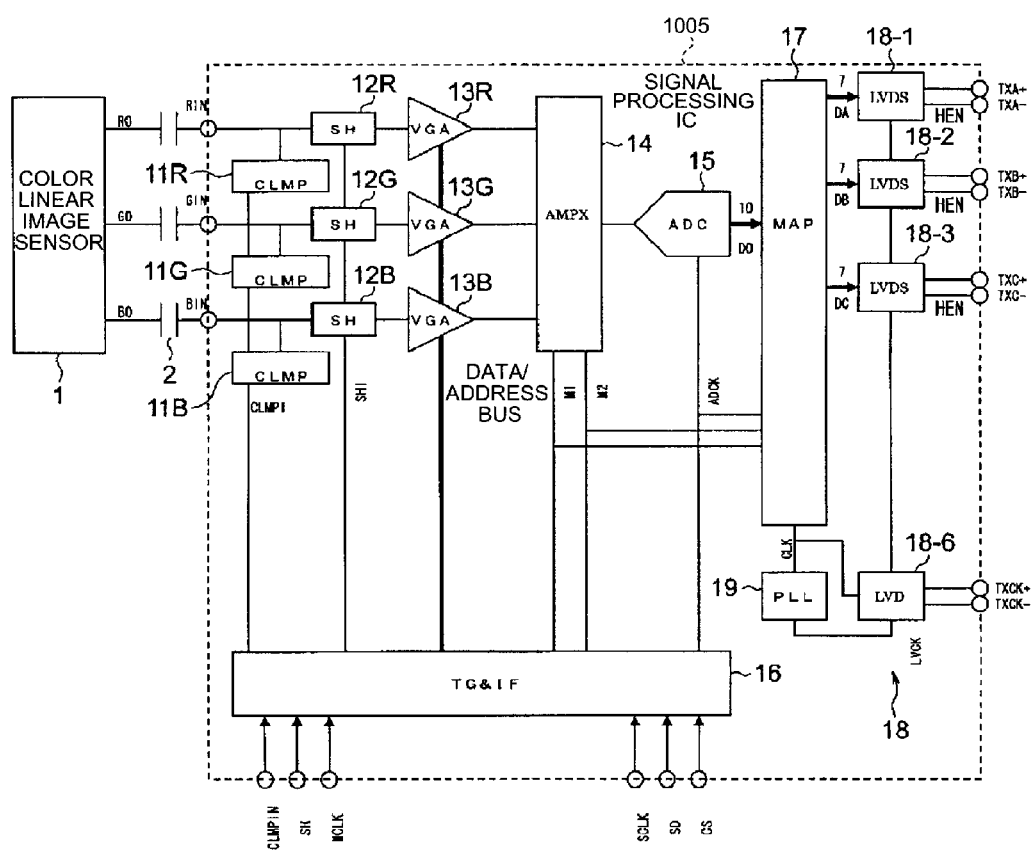
FIG. 9 is a schematic block diagram of an analog signal processor according to a fifth embodiment of the present invention.

FIG. 9 is a schematic block diagram of an analog signal processor according to a fifth embodiment of the present invention. The analog signal processor according to the fifth embodiment includes an analog signal processing IC 1005. In the analog signal processing IC 1005, latch clocks or identification signals that each indicate n plural-bit groups into which digital data for each color is separated are converted to low-amplitude differential signals with digital data for each color and are output as plural serial low-amplitude differential signals.

The fifth embodiment has almost the same configuration as in the fourth embodiment. However, a signal HEN that indicates a high-order bit group of low-amplitude differential signals output from a receiver is embedded in the low-amplitude differential signals and is transmitted concurrently with image data.

Figure 10A:
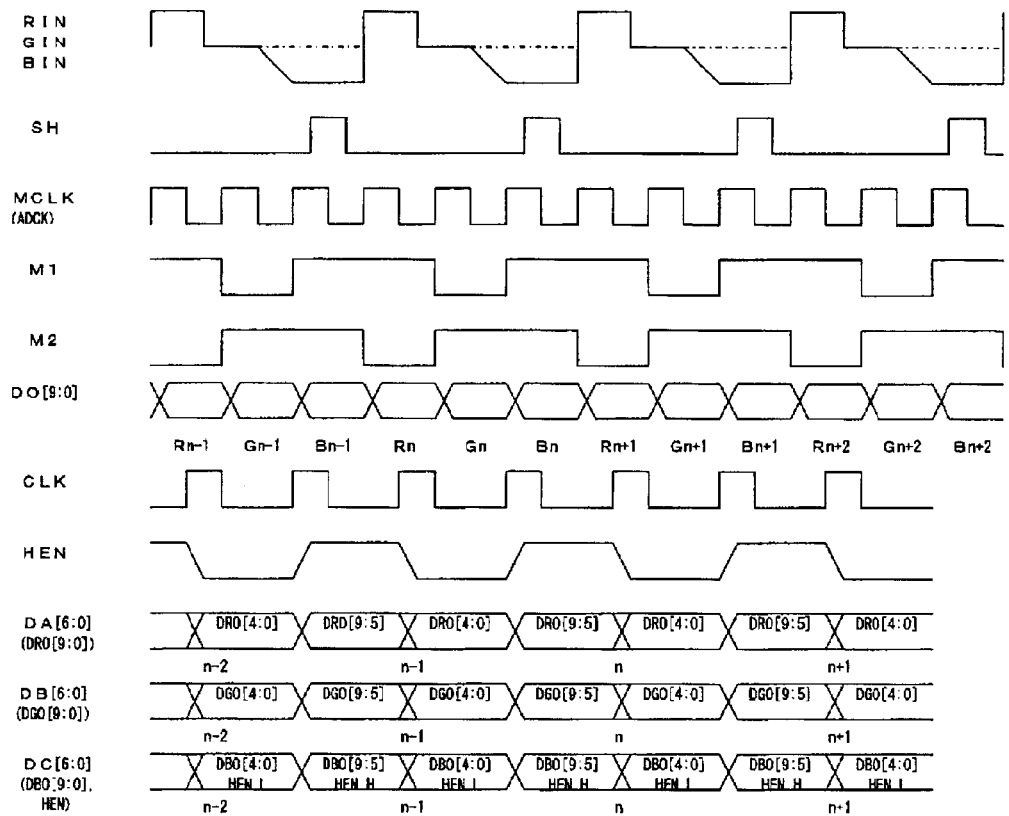
FIGS. 10A and 10B are timing charts of output timings of signals shown in FIG. 9.
Figure 10B:
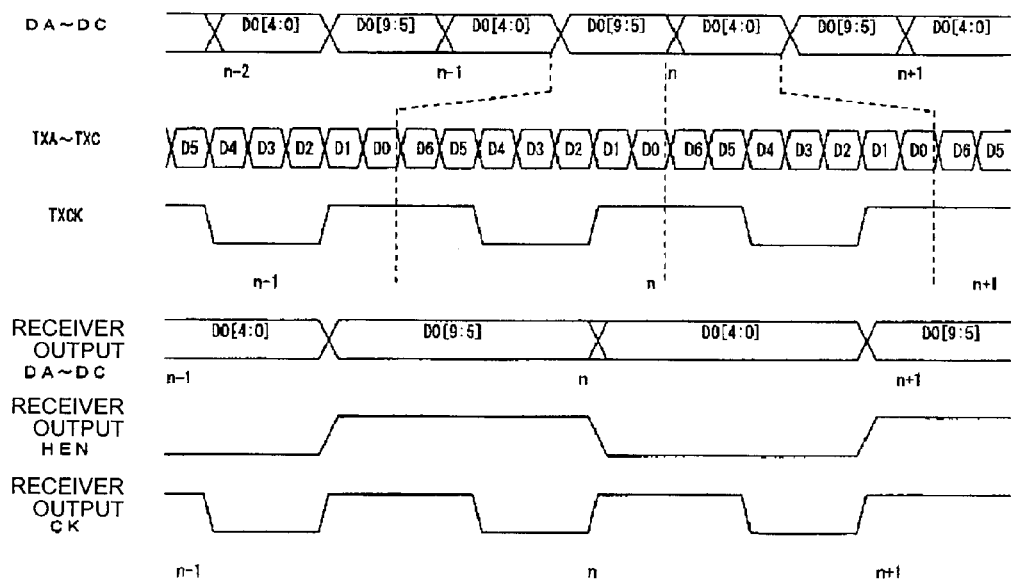

FIGS. 10A and 10B are timing charts for indicating output timing of each signal in the analog signal processor.

Besides, each component that is not particularly explained is constituted and functions in the same manner as in the fourth embodiment.

This configuration enables, in addition to effects of the fourth embodiment, because of transmission of image data and identification signals for multiplexing and restoring separation, easy multiplexing and restoring separation as well as controlling increasing costs accompanied by multiplexing and separation to a minimum.

Figure 11:
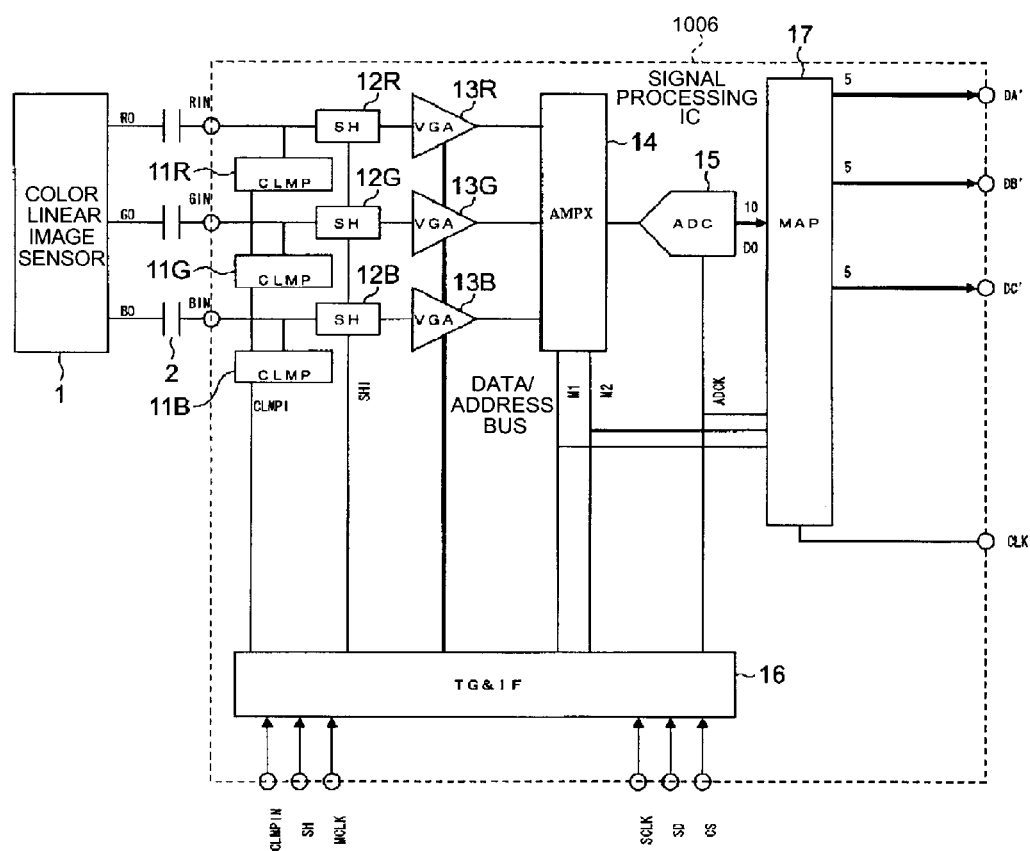
FIG. 11 is a schematic block diagram of an analog signal processor according to a sixth embodiment of the present invention.

FIG. 11 is a schematic block diagram of an analog signal processor according to a sixth embodiment of the present invention. The analog signal processor according to the sixth embodiment includes an analog signal processing IC 1006. In the analog signal processing IC 1006, digital data for each color is separated into plural bit groups and a multiple-bit parallel output is sequentially performed in time division.

Unlike the fifth embodiment, the LVDSs 18 and the PLL 19 are omitted. Point sequential image data DO[9:0] output from the ADC 15 is resolved for each color in the MAP 17 block and furthermore is separated into a high-order bit group and a low-order bit group for each color. The data is output in time sequence in the order of a high-order bit group to a low-order bit group as each 5-bit data of DA'[4:0], DB'[4:0], DC'[4:0]. A clock CLK to latch a high-order bit group and a low-order bit group is also output at the same time in the MAP 17 block.

Figure 12:
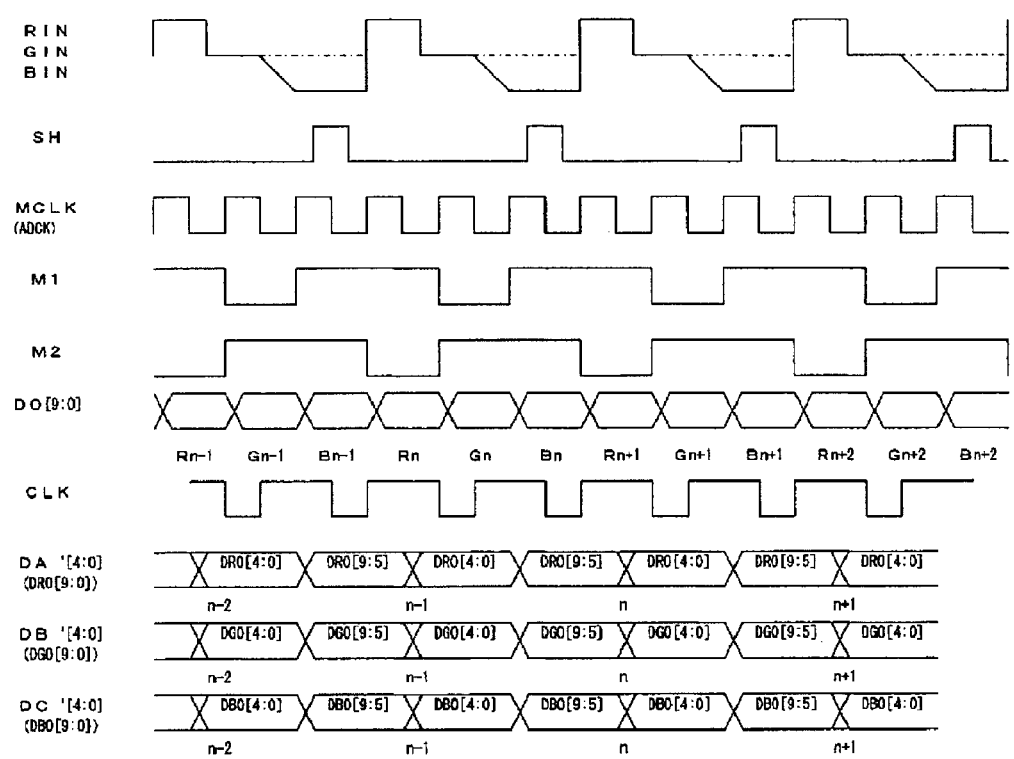
FIG. 12 is a timing chart of output timings of signals shown in FIG. 11.

FIG. 12 is a timing chart for indicating output timing of each signal in the analog signal processor.

Besides, each component that is not particularly explained is constituted and functions in the same manner as in the fifth embodiment.

This configuration enables large reduction of the number of signals at a low-pixel rate and in short-distance transmission because data is separated for each color, is separated into plural bit groups, and is transmitted in time division. Compared with point sequential image data transmission, it is possible to simplify restoring processing.

Figure 13:
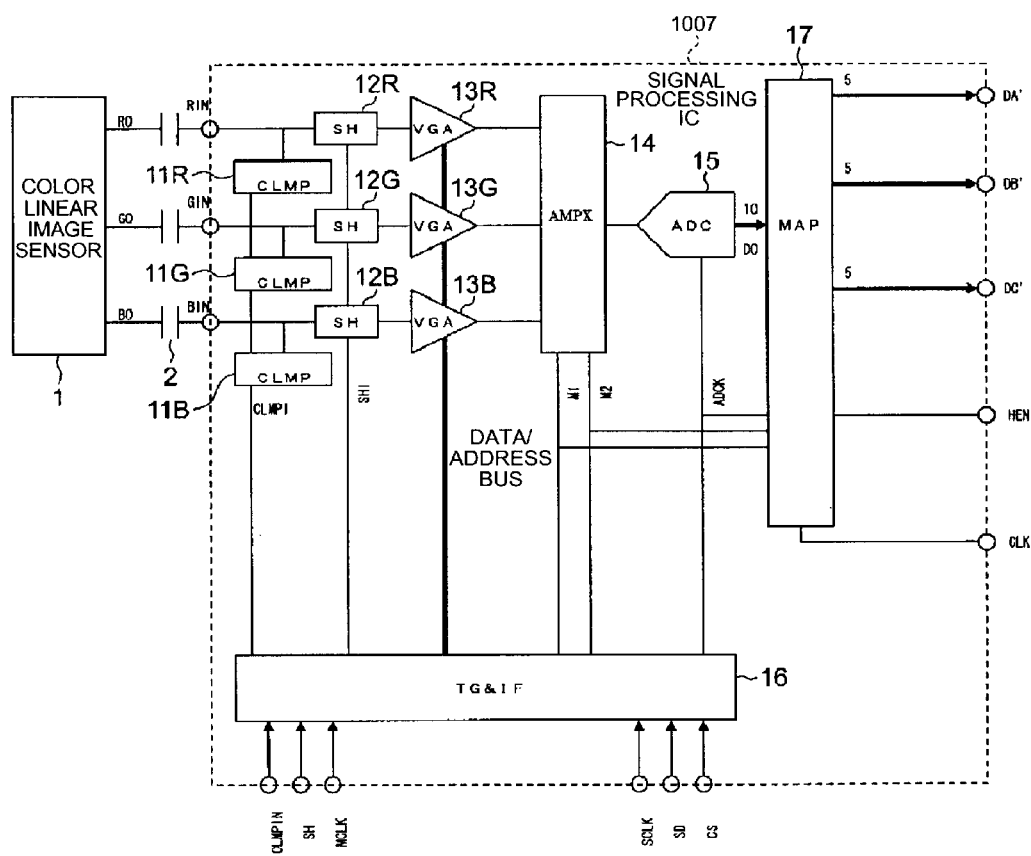
FIG. 13 is a schematic block diagram of an analog signal processor according to a seventh embodiment of the present invention.

FIG. 13 is a schematic block diagram of an analog signal processor according to a seventh embodiment of the present invention. The analog signal processor according to the seventh embodiment includes an analog signal processing IC 1007. In the analog signal processing IC 1007, digital data that is separated for each color and for each of plural bit groups and is sequentially subjected to multiple-bit parallel output in time division is output with a latch clock or an identification signal that corresponds to each of plural-bit groups.

With respect to the circuit of the sixth embodiment, besides DA'[4:0] to DC'[4:0], CLK, a signal HEN that indicates a high-order bit group in DA'[4:0] to DC'[4:0] is also output.

Figure 14:
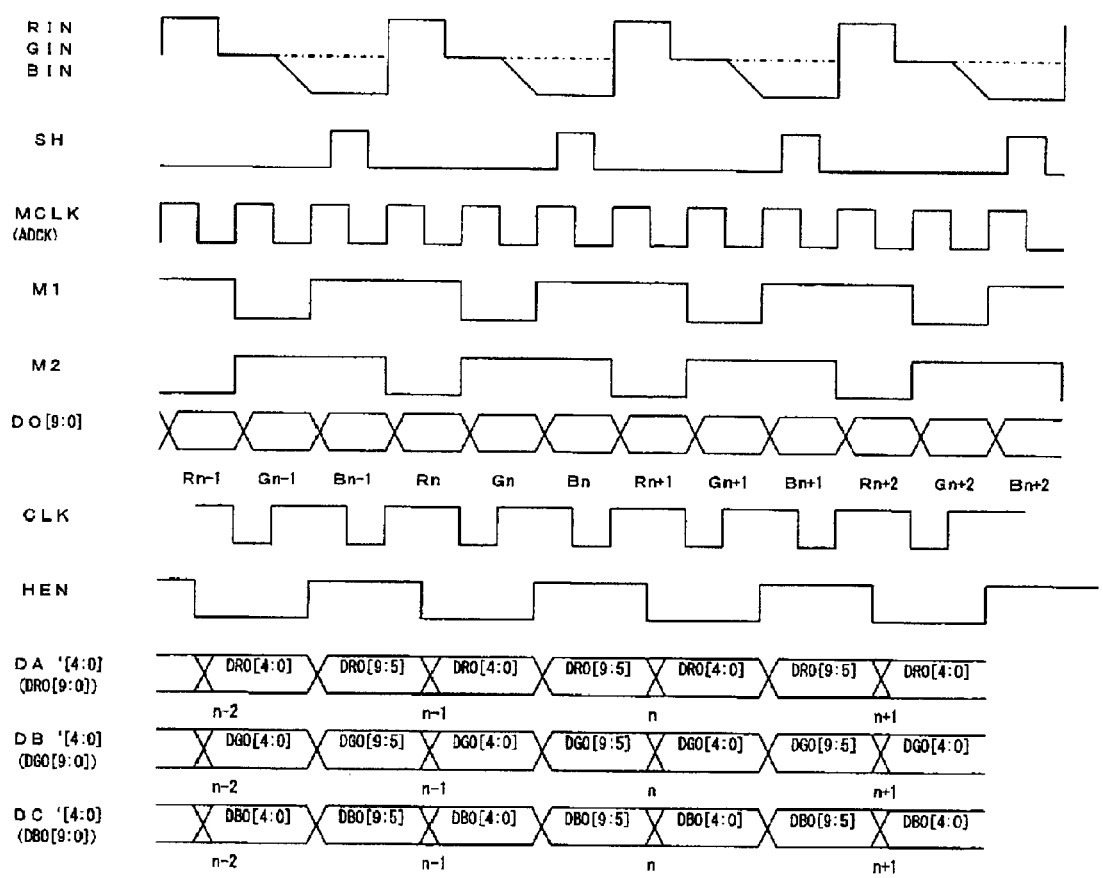
FIG. 14 is a timing chart of output timings of signal shown in FIG. 13.

FIG. 14 is a timing chart for indicating output timing of each signal in the analog signal processor.

Besides, each component that is not particularly explained is constituted and functions in the same manner as in the sixth embodiment.

This configuration makes it possible, in addition to effects of the sixth embodiment, to easily restore separated bit groups because image data is separated for each color and separated into plural bit groups and a bit-group identification signal is added thereto.

Figure 15:
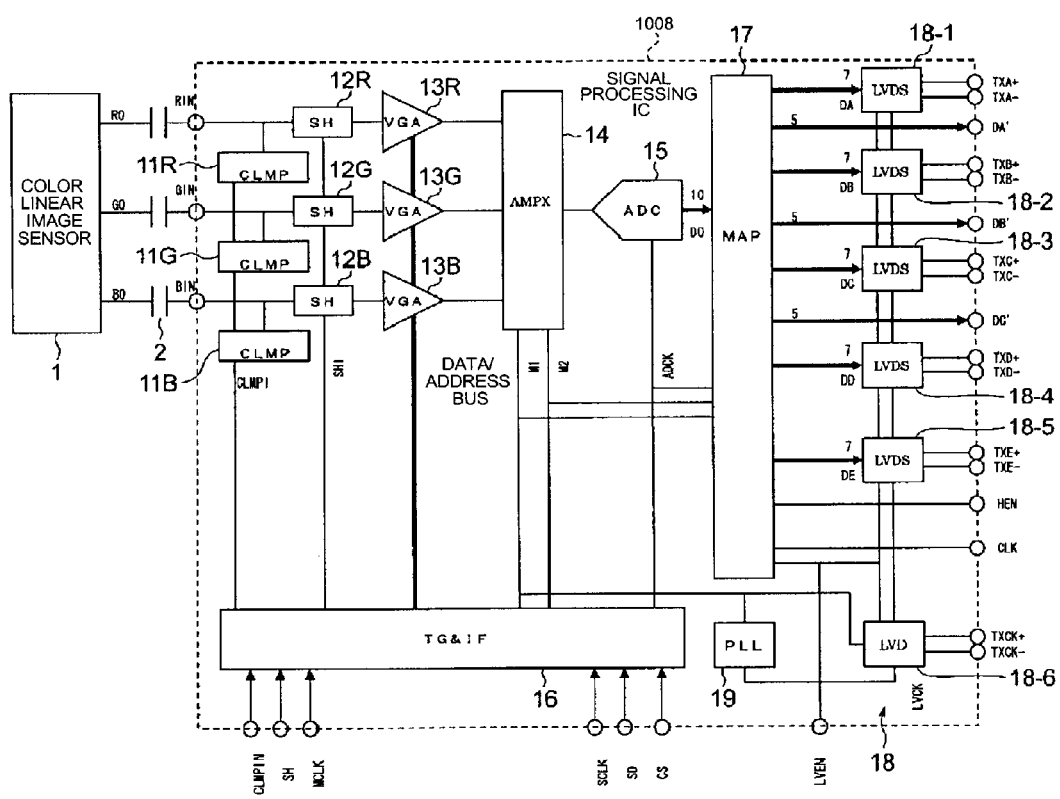
FIG. 15 is a schematic block diagram of an analog signal processor according to an eighth embodiment of the present invention.

FIG. 15 is a schematic block diagram of an analog signal processor according to an eighth embodiment of the present invention. The analog signal processor according to the eighth embodiment includes an analog signal processing IC 1008. In the analog signal processing IC 1008 is a combination of configurations of the analog signal processing IC 1001 and the analog signal processing IC 1006. Specifically, the analog signal processor 1008 includes output terminals for low-amplitude differential signal outputs TXA to TXE, TXCK, parallel outputs DA', DB', DC', a high-order bit group identification signal HEN, and a high-order/low-order bit group latch clock CLK and a switching terminal LVEN for an output mode. In this circuit, when the switching terminal LVEN for an output mode is "H", low-amplitude differential signals TXA to TXE, TXCK are valid and parallel outputs DA' to DC', HEN, CLK are at high impedance or H/L fixed output. On the other hand, when the switching terminal LVEN for an output mode is "L", parallel outputs DA' to DC', HEN, CLK are valid and low-amplitude differential signals TXA to TXE, TXCK are at high impedance or H/L fixed output.

Figure 16:
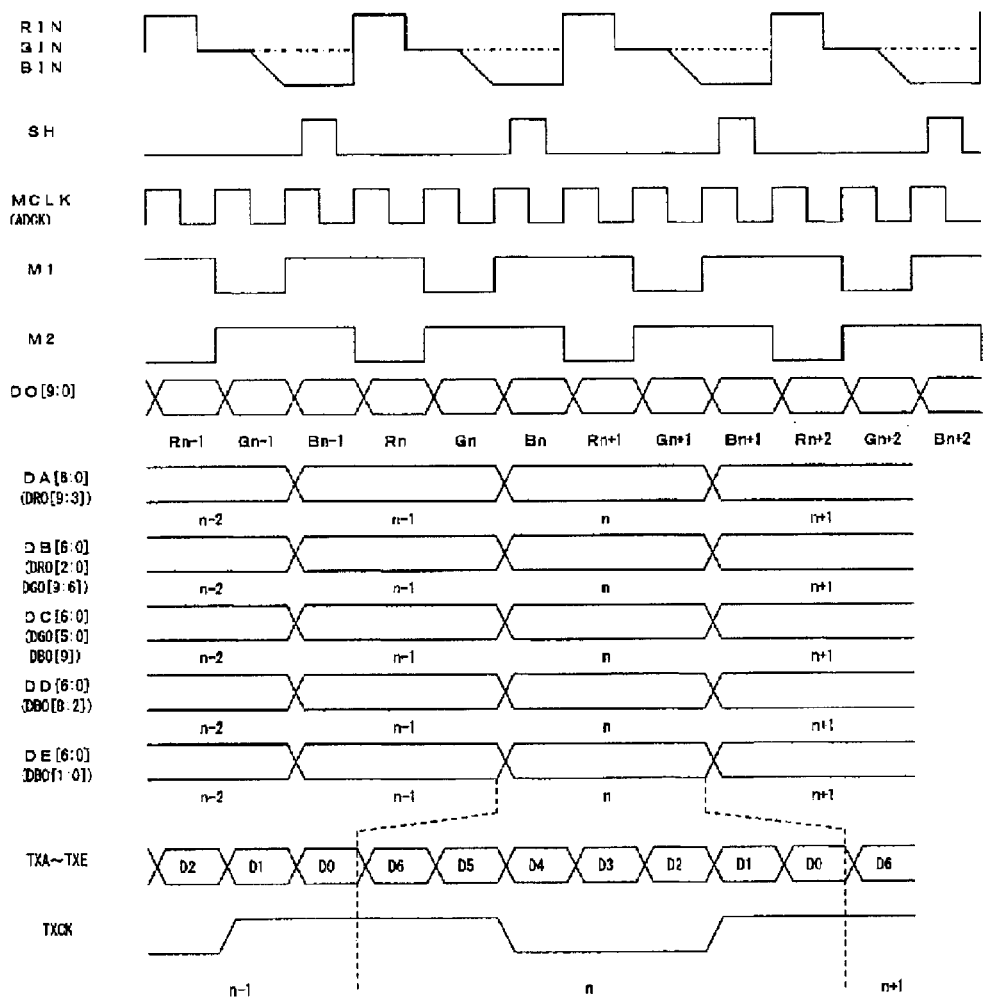
FIG. 16 is a timing chart of output timings of signals when a switching terminal LVEN shown in FIG. 15 is "H"
Figure 17:
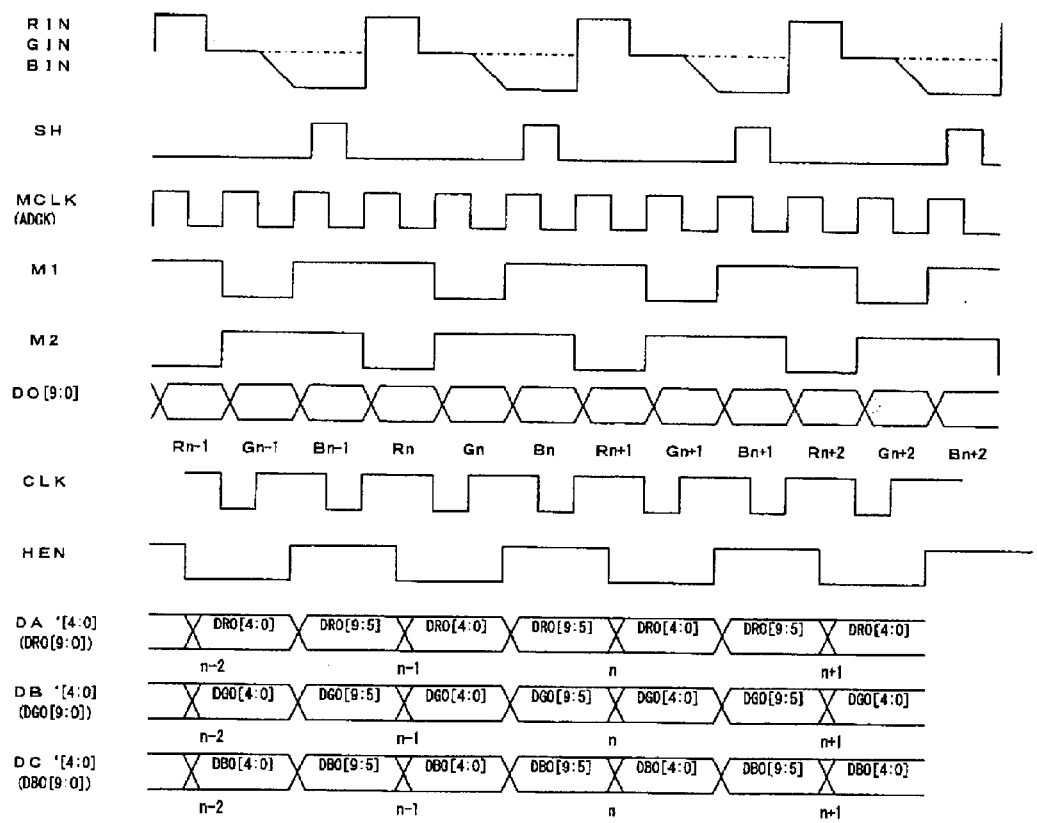
FIG. 17 is a timing chart of output timings of signals when the switching terminal LVEN shown in FIG. 15 is "L"

FIG. 16 is a timing chart for indicating output timing of each signal in the analog signal processor when the switching terminal LVEN of an output mode is "H". FIG. 17 is a timing chart for indicating output timing of each signal in the analog signal processor when the switching terminal LVEN of an output mode is "L".

Besides, each component that is not particularly explained is constituted and functions in the same manner as in the first and sixth embodiments.

This configuration makes it possible to perform data transmission that matches a system at low costs because of a function of performing both of low-amplitude differential transmission and parallel transmission.

Figure 18:
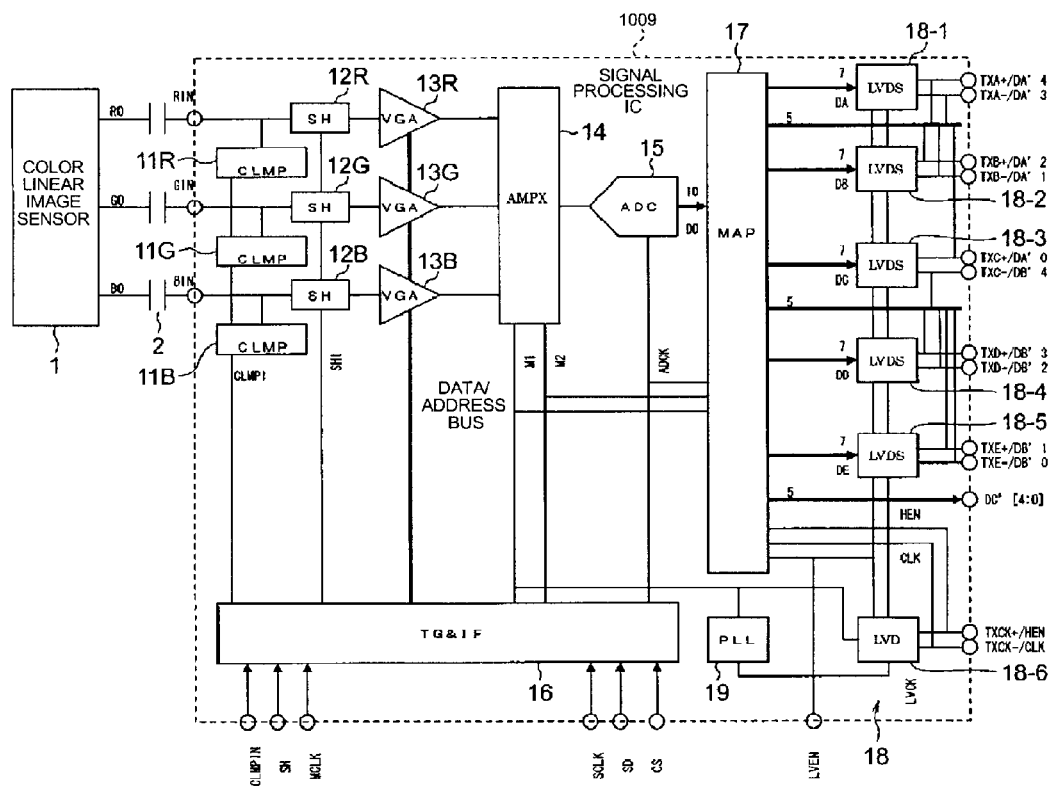
FIG. 18 is a schematic block diagram of an analog signal processor according to a ninth embodiment of the present invention.

FIG. 18 is a schematic block diagram of an analog signal processor according to a ninth embodiment of the present invention. The analog signal processor according to the ninth embodiment includes an analog signal processing IC 1009. In the analog signal processing IC 1009, low-amplitude differential signal outputs TXA to TXE, TXCK and parallel outputs DA' to DC', HEN, and CLK are in common with one terminal respectively unlike the circuit of the eighth embodiment. When LVEN=H, in response to a condition in an output-mode switching terminal, the embodiment is in a low-amplitude differential signal output mode. When LVEN=L, the analog signal processor 1009 is in a parallel output mode. In the low-amplitude differential signal output mode, likewise of the eighth embodiment, output terminals for low-amplitude differential signals TXA to TXE, TXCK are valid and parallel outputs DA' to DC', HEN, CLK are at high impedance or H/L fixed output. On the other hand, in the parallel output mode, parallel outputs DA' to DC', HEN, CLK are valid and low-amplitude differential signals TXA to TXE, TXCK are at high impedance or H/L fixed output.

Figure 19:
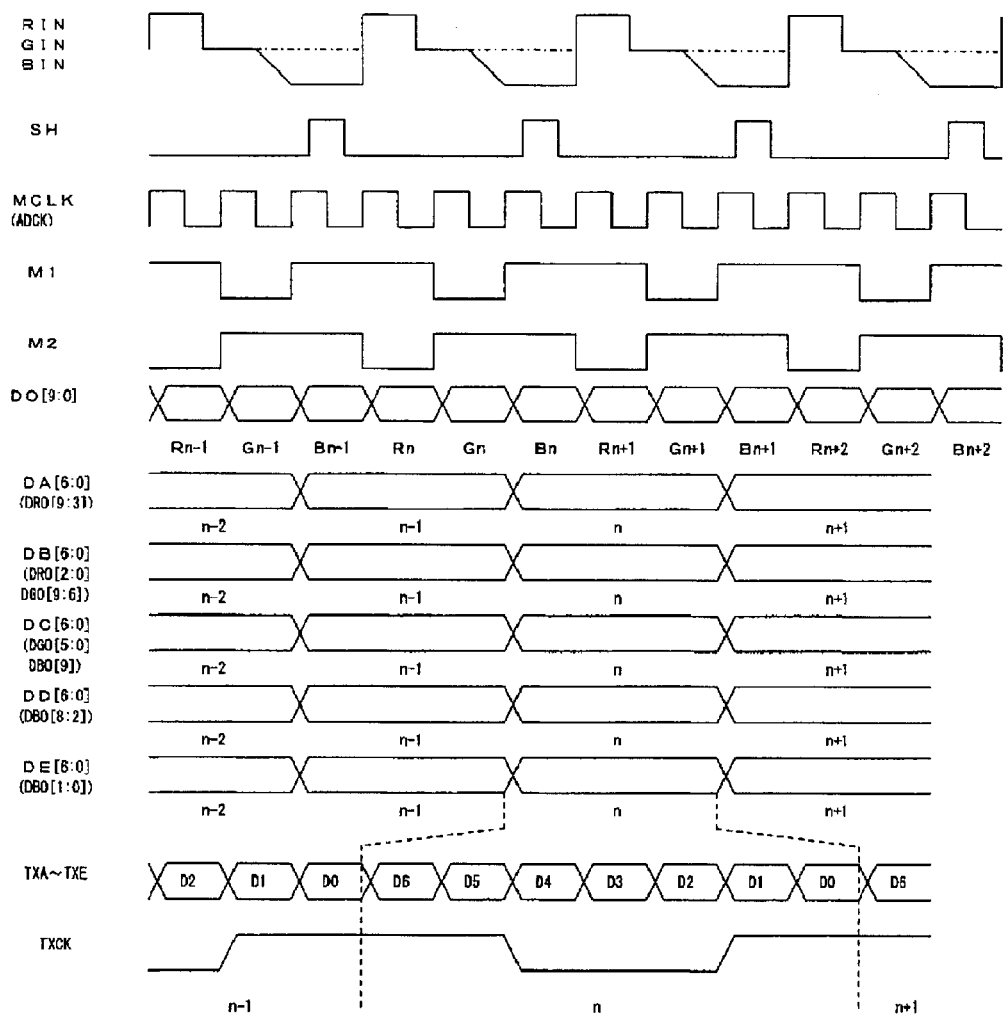
FIG. 19 is a timing chart of output timings of signals when the analog signal processor shown in FIG. 18 is in a low-amplitude differential output mode.
Figure 20:
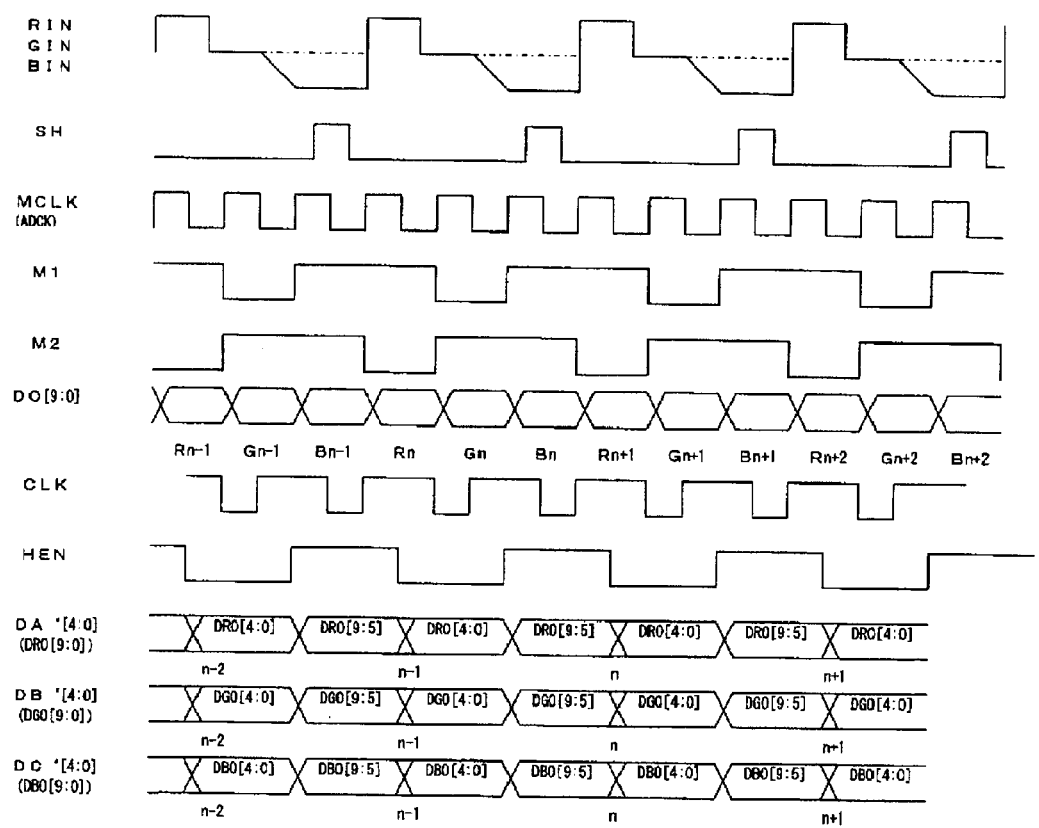
FIG. 20 is a timing chart of output timings of signals when the analog signal processor shown in FIG. 18 is in a parallel output mode.

FIG. 19 is a timing chart for indicating output timing of each signal in the analog signal processor in the low-amplitude differential signal output mode. FIG. 20 is a timing chart for indicating output timing of each signal in the analog signal processor in the parallel output mode.

Besides, each component that is not particularly explained is constituted and functions in the same manner as in the eighth embodiment.

This configuration enables, in addition to effects of the eighth embodiment, implementation of low-amplitude differential signal transmission and parallel transmission with a small number of terminals and compact-size and low-cost signal processing IC.

Figure 21:
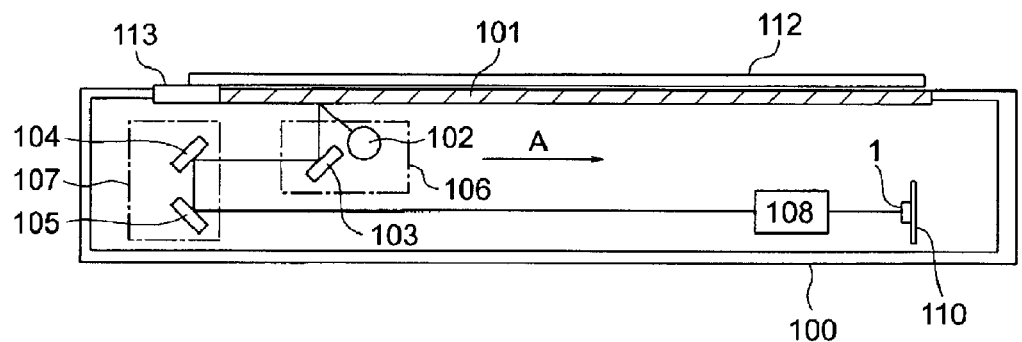
FIG. 21 is a schematic side view of an image reading apparatus according to a tenth embodiment of the present invention.

FIG. 21 is a schematic side view of an image reading apparatus according to a ninth embodiment of the present invention. The image reading apparatus is a scanner, for example, that is connected to a personal computer (PC) or mounted on a color digital copier. In this type of image reading apparatus, a document image is read by the color linear image sensor 1 and processed by converting image signals to digital signals. As shown in FIG. 21, the image reading apparatus includes a contact glass 101 on which a document sheet 112 is placed, a first carriage 106 on which a halogen lamp 102 for exposing documents and a first reflection mirror 103 are mounted, a second carriage 107 on which a second reflection mirror 104 and a third reflection mirror 105 are mounted, the color linear image sensor 1 for performing photoelectric conversion to incident light, a lens unit 108 for forming an image on the color linear image sensor 1 through reading light incident from the third mirror 105, and a white reference plate 113 that is arranged at the top of a scanner 100 to correct various distortions caused by a reading optical system. The color linear image sensor 1 is mounted on a sensor board unit 110 and predetermined processing is performed to signals to which photoelectric conversion is performed by the color linear image sensor 1 on the sensor board unit 110. That is, any of the analog signal processing ICs 1001 to 1008 can be mounted on the sensor board unit 110.

When scanning document sheets, the first carriage 106 and the second carriage 107 are moved by a stepping motor (not shown) at a speed ratio of two to one along a rail (not shown) in a sub-scanning direction A and read document sheets.

Figure 22:
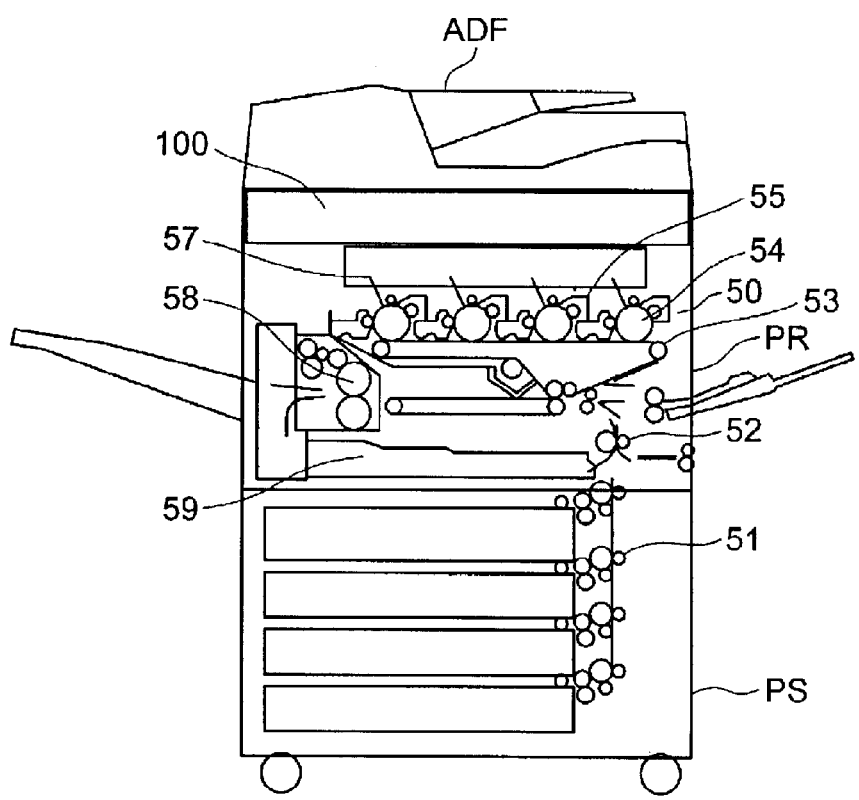
FIG. 22 is a schematic side view of a tandem image forming apparatus according to an eleventh embodiment of the present invention.
Figure 23:
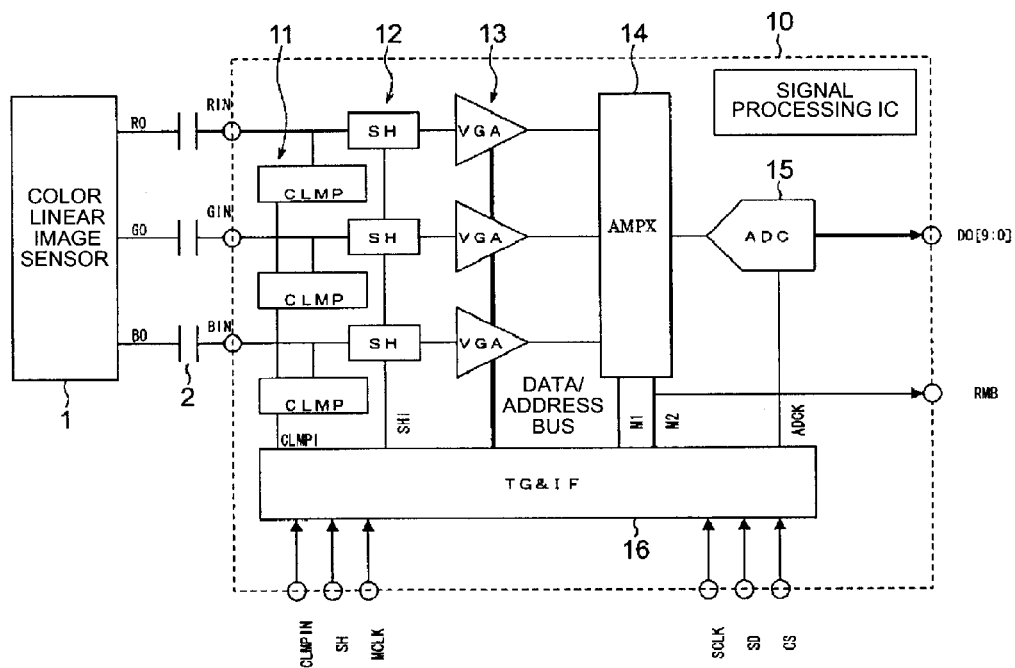
FIG. 23 is a schematic block diagram of a conventional signal processor.
Figure 24:
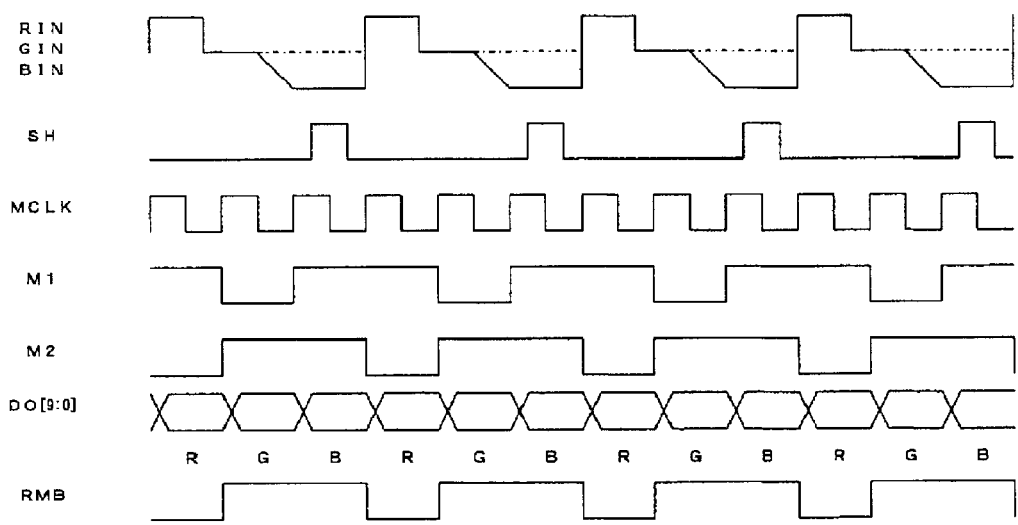
FIG. 24 is a timing chart of output timings of signals shown in FIG. 23.

FIG. 22 is a schematic side view of the whole tandem image forming apparatus on which the image reading apparatus shown in FIG. 21 is mounted. The image forming apparatus basically includes a paper feeder PS, the image forming apparatus body PR, a scanner (a document reading apparatus) 100, and an automatic document feeder (ADF). The image forming apparatus body PR includes a tandem image forming unit 50, resist rollers 52 for supplying recording paper through a transmission path 51 from the paper feeder PS to the image forming unit 50, an optical writing device 57, a fixing/transmitting unit 58, and a two-side tray 59. The image forming unit 50 includes four photoconductor drums 54 arranged in parallel with one another, each of which corresponds to four colors of YMCK. Around each of the photoconductor drums 54, the image forming unit 50 also includes image forming components, such as a charger, a developing device 55, a transfer device, a cleaner, and a static eliminator. Moreover, an intermediate transfer belt 53 is laid across in a tensioned condition between a driving roller and a driven roller while sandwiched in a nip between the transfer device and the photoconductor drum 54.

In this tandem image forming apparatus, optical writing is performed to the photoconductor drums 54, each of which corresponds to each color of YMCK. An image on the photoconductor drum 54 is developed for each color of toners by the developing device 55 and a first transfer is performed on the intermediate transfer belt 53, for example, in the order of Y, M, C, K. A full-color image on which four colors are superimposed through the first transfer is subjected to a second transfer on recording paper, then fixed, and the resulting paper is discharged, thereby forming the full-color image on the recording paper.

In the above embodiments, a color linear image sensor corresponds to a reference numeral 1, a unit for sampling and holding corresponds to sample-hold circuits 12R, 12G, 12B, a unit for amplifying corresponds to variable gain amplifiers 13R, 13G, 13B, a unit for analog-digital conversion corresponds to an analog-digital converter 15, a unit for outputting as a plurality of serial low-amplitude differential signals corresponds to a MAP 17 and LVDSs 18-1 to 18-6, a unit for multiple-bit parallel output corresponds to the MAP 17, an image reading apparatus corresponds to a reference numeral 100, and an image forming apparatus corresponds to a reference sign PR.

The read signal processor according to the first to ninth embodiments forms images as described above or functions as a first stage when capturing an image on a personal computer (PC).

According to the above explained embodiments, the read signal processor includes a unit that outputs as a plurality of serial low-amplitude differential signals or a unit that sequentially performs multiple-bit parallel output in time division. As a result, it is possible to correspond to a low-to-medium transmission rate and reduce an area to be implemented and a component count.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A read signal processor comprising:
a sample-hold unit that sample-holds a designated range of each pixel of a sensor output signal for each color with respect to output from a color linear image sensor corresponding to three colors, and outputs a sample-held signal corresponding to each of the colors;
an amplifying unit that amplifies the sample-held signals based on a set gain, and outputs an amplified signal corresponding to each of the colors;
a converting unit that analog-digital converts the amplified signals to obtain digital data for each of the colors; and
an output unit that serializes a plurality of bits of the digital data for each of the colors to obtain a plurality of serial signals, converts the serial signals to a plurality of low-amplitude differential signals, and outputs serial low-amplitude differential signals.

2. The read signal processor according to claim 1, wherein the output unit n-multiplexes the digital data for each of the colors with regard to time and transmits the data at an n-fold data rate.

3. The read signal processor according to claim 2, wherein the output unit serializes the digital data for each of the color and a clock that corresponds to a data rate of the digital data for each of the colors to obtain a plurality of serial signals, converts the serial signals to a plurality of low-amplitude differential signals, and outputs the serial low-amplitude differential signals.

4. The read signal processor according to claim 1, wherein the output unit separates the digital data for each of the colors into n plural-bit groups, sequentially converts the bit groups to time-division data, and transmits the time-division data at an n-fold data rate as the serial low-amplitude differential signals.

5. The read signal processor according to claim 4, wherein the output unit converts a latch clock or an identification signal of each bit group of the digital data for each of the colors that is separated into n plural-bit groups to low-amplitude differential signals with digital data for each color and outputs resulting signals as the serial low-amplitude differential signals.

6. The read signal processor according to claim 1, further comprising a separating unit that separates the digital data for each of the colors to plural bit groups and sequentially performs multiple-bit parallel output in time division.

7. The read signal processor according to claim 6, wherein the separating unit outputs digital data that is separated into plural bit groups for each of the colors and is sequentially subjected to a multiple-bit parallel output in time division with a latch clock or an identification signal that corresponds to each of the bit groups.

8. The read signal processor according to claim 6, wherein output terminals are used in common partly or entirely for a plurality of serial low-amplitude differential signals, for multiple-bit parallel output, and for clock output in common partly or entirely.

9. A read signal processor according to claim 1, wherein the read signal processor is an integrated circuit.

10. An image reading apparatus comprising:
the read signal processor according to claim 1.

11. An image forming apparatus comprising:
the image reading apparatus according to claim 10.

12. A read signal processor comprising:
a sample-hold unit that sample-holds a designated range of each pixel of a sensor output signal for each color with respect to output from a color linear image sensor corresponding to three colors, and outputs a sample-held signal corresponding to each of the colors;
an amplifying unit that amplifies the sample-held signals based on a set gain, and outputs an amplified signal corresponding to each of the colors;
a converting unit that analog-digital converts the amplified signals to obtain digital data for each of the colors; and
a separating unit that separates the digital data for each of the colors into a plurality of bit groups and sequentially performs multiple-bit parallel output in time division.

13. The read signal processor according to claim 12, wherein the separating unit outputs digital data that is separated into plural bit groups for each of the colors and is sequentially subjected to a multiple-bit parallel output in time division with a latch clock or an identification signal that corresponds to each of the bit groups.

14. A read signal processor according to claim 12, wherein the read signal processor is an integrated circuit.

15. An image reading apparatus comprising:
the read signal processor according to claim 12.

16. An image forming apparatus comprising:
the image reading apparatus according to claim 15.

* * * * *